(12) United States Patent
Caruel

(10) Patent No.: US 10,087,841 B2
(45) Date of Patent: Oct. 2, 2018

(54) NACELLE EQUIPPED WITH AN OIL-COOLING CIRCUIT COMPRISING AN INTERMEDIATE HEAT EXCHANGER

(71) Applicant: AIRCELLE, Gonfreville l'Orcher (FR)

(72) Inventor: Pierre Caruel, Le Havre (FR)

(73) Assignee: AIRCELLE, Gonfreville l'Orcher (FR)

( * ) Notice: Subject to any disclaimer, the term of this patent is extended or adjusted under 35 U.S.C. 154(b) by 426 days.

(21) Appl. No.: 14/846,129

(22) Filed: Sep. 4, 2015

(65) Prior Publication Data

US 2015/0377132 A1 Dec. 31, 2015

Related U.S. Application Data

(63) Continuation of application No. PCT/FR2014/050520, filed on Mar. 7, 2014.

(30) Foreign Application Priority Data

Mar. 7, 2013 (FR) ...................... 13 52069

(51) Int. Cl.
*F02C 7/14* (2006.01)
*F01D 25/24* (2006.01)
(Continued)

(52) U.S. Cl.
CPC ................ *F02C 7/14* (2013.01); *B64D 33/02* (2013.01); *F01D 25/12* (2013.01); *F01D 25/24* (2013.01);
(Continued)

(58) Field of Classification Search
CPC ......... F01D 25/12; F01D 25/24; B64D 15/00; B64D 15/02; B64D 15/04;
(Continued)

(56) References Cited

U.S. PATENT DOCUMENTS

| 4,782,658 A | 11/1988 | Perry | |
|---|---|---|---|
| 6,131,855 A * | 10/2000 | Porte | B64D 15/04 244/134 B |
| 7,398,641 B2 * | 7/2008 | Stretton | F02C 7/047 244/134 B |

FOREIGN PATENT DOCUMENTS

| EP | 1479889 A2 | 11/2014 |
| FR | 2958974 A1 | 10/2011 |
| GB | 2204361 A | 11/1988 |

OTHER PUBLICATIONS

International Search Report dated Jun. 5, 2014 in International Application No. PCT/FR2014/050520.
(Continued)

*Primary Examiner* — Jason Shanske
*Assistant Examiner* — Julian Getachew
(74) *Attorney, Agent, or Firm* — Burris Law, PLLC

(57) ABSTRACT

The present disclosure provides an aircraft nacelle including: an outer aerodynamic wall having an upstream air intake lip; an inner aerodynamic wall, the air intake lip connecting the two outer and inner aerodynamic skins; a front wall arranged downstream of the air intake lip and connecting the two outer and inner aerodynamic skins; and a network for the circulation of a first fluid for cooling a second fluid. The network includes two air/oil-type heat exchangers, one air/air type heat exchanger, an air scoop to collect air from the outside of the nacelle, an orifice to collect cold air, and an outlet orifice to discharge air.

10 Claims, 8 Drawing Sheets

(51) Int. Cl.
*F01D 25/12* (2006.01)
*B64D 33/02* (2006.01)

(52) U.S. Cl.
CPC .............. *B64D 2033/0233* (2013.01); *F05D 2220/323* (2013.01); *F05D 2260/213* (2013.01); *Y02T 50/675* (2013.01)

(58) Field of Classification Search
CPC . B64D 2033/0233; B64D 33/02; F02C 7/047; F02C 7/14
See application file for complete search history.

(56) References Cited

OTHER PUBLICATIONS

Derby, "The Jet Engine", Jet Engine, Jan. 1, 1986, pp. 147-151, (Rolls-Royce), Rolls Royce Plc. GB. , XP002310532.

\* cited by examiner

# NACELLE EQUIPPED WITH AN OIL-COOLING CIRCUIT COMPRISING AN INTERMEDIATE HEAT EXCHANGER

CROSS-REFERENCE TO RELATED APPLICATIONS

This application is a continuation of International Application No. PCT/FR2014/050520, filed on Mar. 7, 2014, which claims the benefit of FR 13/52069, filed on Mar. 7, 2013. The disclosures of the above applications are incorporated herein by reference.

FIELD

The present disclosure relates to a nacelle for a turbojet engine equipped with a cooling system for the engine oil.

BACKGROUND

The statements in this section merely provide background information related to the present disclosure and may not constitute prior art.

An aircraft is driven by one or several propulsion units each comprising a turbojet engine housed in a tubular nacelle. Each propulsion unit is fastened to the aircraft by a mast which is generally located under or above a wing or at the fuselage.

By upstream, it is referred to everything that lies before the considered point or element, in the direction of the air flow in a turbojet engine, and by downstream, it is referred to everything that lies after the considered point or element, in the direction of the air flow in a turbojet engine.

A nacelle generally has a structure comprising an air inlet upstream of the engine, a mid-section intended to surround a fan or the compressors of the turbojet engine and its casing, a downstream section able to integrate thrust reversal means and intended to surround the gas turbine of the turbojet engine, and is generally terminated by an ejection nozzle the outlet of which is located downstream of the turbojet engine.

Conventionally, the space that it is comprised between the nacelle and the turbojet engine is called the secondary duct.

In general, the turbojet engine comprises a set of blades (the compressor, and possibly a fan or an unshrouded propeller) which are driven in rotation by a gas turbine via a set of mechanical transmission means.

A lubricant distribution system is provided in order to provide good lubrication of these transmission means and any other accessory such as the electric generators, and to cool them.

As a consequence, the lubricant must also be cooled by a heat exchanger.

To this end, a first known method consists of cooling the lubricant by conveying it through an air/oil heat exchanger which uses air that is collected in a secondary duct (so-called the cold stream) of the nacelle or in either one of the compressor stages.

Collecting and conveying air through this heat exchanger disturbs the air flow stream and results in a loss of thrust of the engine, which is not desired.

In particular, it has been assessed that, in the case of a geared turbofan engine, this may represent losses that are equivalent to 1% of the total fuel consumption.

Another solution has appeared with the nacelle deicing systems.

In fact, during flight and depending on the conditions of temperature and humidity, ice may form on the nacelle, in particular at the outer surface of the air inlet lip which equips the air inlet section.

The presence of ice or frost modifies the aerodynamic properties of the air inlet and disturbs the delivery of air toward the fan. In addition, the formation of frost on the air inlet of the nacelle and the ingestion of ice by the engine in the case where the ice blocks are detached may damage the engine or the wings, and pose a risk to the safety of the flight.

Another solution for defrosting the outer surface of the nacelle consists in preventing ice from forming on this outer surface by maintaining the considered surface at a sufficient temperature.

Thus, the lubricant heat may be used to reheat the outer surfaces of the nacelle, and consequently, the lubricant is cooled and ready to be used again in the lubrication circuit.

In particular, the documents U.S. Pat. No. 4,782,658 and EP1479889 describe the implementation of such defrosting systems which use the heat of the engine lubricant.

More specifically, the document U.S. Pat. No. 4,782,658 describes a defrosting system which uses external air that is collected by an air scoop and reheated through an air/oil heat exchanger in order to serve for defrosting. Such a system allows for a better control of the exchanged heat flows, but the presence of air scoops at the outer surface of the nacelle results in a loss of the aerodynamic performances.

As for the document EP1479889 it describes, a system for defrosting an air inlet structure of a nacelle of a turbojet engine which uses an air/oil heat exchanger in a closed circuit, the reheated internal air of the air inlet structure being driven in forced convection by a blower.

It is worth noting that the air inlet structure is hollow and it forms a closed chamber intended for conveying the defrosting air which is reheated by the heat exchanger disposed inside this chamber.

Thus, the heat energy that is available for defrosting depends on the temperature of the lubricant.

Furthermore, the exchange surface of the air inlet structure is stationary and limited, and the energy that is actually dissipated depends mainly on the heat that is required for defrosting, and hence, it is dependent on the external conditions.

It follows that the lubricant cooling, as well as the temperature at which the air inlet is maintained, are difficult to control.

There is another solution wherein a heat exchanger and ducts for circulating a fluid to be reheated are associated so as to form several loops for recirculating the fluid to be reheated through the heat exchanger, and in such a manner that an area intended for circulating the fluid to be reheated is in contact with an outer wall so as to allow a conductive heat exchange with the external air of the nacelle. The circulation of the fluid to be reheated is achieved by forced circulation.

It has been observed that systems such as those described before cause pressure drops in the secondary duct due to the presence of the heat exchanger, and cause engine thrust losses when an air collection is performed in the secondary duct where these losses considerably affect the consumption (they represent about 0.5% of the total consumption). Furthermore, such systems have a poor efficiency when the turbojet engine idles and/or rotates at low speed (for example, when the aircraft is on the ground, during the taxiing phase) in the case where cooling the engine oil requires collecting air from the outside of the nacelle.

SUMMARY

The present disclosure provides a nacelle for an aircraft comprising: an outer aerodynamic skin comprising an upstream air inlet lip, an inner aerodynamic skin, the air inlet lip connecting upstream the two outer and inner aerodynamic skins, a front partition wall located immediately downstream of the lip and connecting the two outer and inner aerodynamic skins, a circulation network for a first fluid intended for cooling a second fluid comprising at least two air/oil type heat exchangers and at least one air/air type heat exchanger, characterized in that the circulation network (1) comprises at least one dynamic air scoop (112) for collecting air from the outside of the nacelle (100), at least one orifice (121) for collecting cold air from a fan (130) and at least one outlet orifice (113) for discharging air out of the nacelle (100).

The air inlet lip may or may not be integrated into the outer aerodynamic skin of the aircraft nacelle.

According to other features of the present disclosure, the nacelle includes one or several of the following features, considered separately or according to any possible combination:
- the air/air type heat exchanger is located, with regard to the path of the first fluid, between the two air/oil type heat exchangers;
- the air/air type heat exchanger is a surface heat exchanger which has an exchange surface;
- the exchange surface is produced from the outer aerodynamic skin of the nacelle;
- the air/air type heat exchanger comprises an intermediate wall pierced by a plurality of orifices;
- the air/air type heat exchanger has a confined space, comprising an inlet and an outlet for the first fluid, enclosed by walls including the exchange surface and a peripheral wall;
- the confined space is located in the air inlet lip;
- the nacelle comprises at least one controlled means for collecting hot air coming from a compressor of the aircraft so as to allow supplying the air inlet lip with hot air;
- the nacelle comprises at least one high-pressure injector which is controlled so as to inject hot air coming from the controlled hot air collection means in the air inlet lip;
- the outer aerodynamic skin comprises at least one outlet orifice for discharging the reheated first fluid out of the nacelle after having flowed through the network.

This solution improves the cooling of the second fluid while reducing the pressure drops in the nacelle. In some cases, it also defrosts the air inlet lip. In fact, the pressure that is collected on the outside, at high speed, is sufficient for supplying the two air/oil type heat exchangers in series, the air/air type heat exchanger lowers the temperature at the inlet of the second heat exchanger in which the air penetrates. At low speed, the pressure that is collected from the fan only allows supplying one of the two heat exchangers, therefore, these are supplied in parallel. In comparison with a solution that is known by those skilled in the art where the two heat exchangers always operate in parallel, even when the aircraft is flying at high speed, the proposed solution allows dividing by two the flow rate of the collected air, and therefore, dividing by two the losses that are related to the cooling of the engine oil.

The solution reduces the total consumption of the aircraft by approximately from 0.25% to 0.4% in comparison with a cooling performed only by collection in the secondary duct. In the cases where it allows defrosting the air inlet lip, it then allows reducing the temperature of the air inlet lip, thereby reducing the recurrent issues of fatigue, and by the upstream area of the outer aerodynamic skin, the temperature of said area not exceeding the maximum temperature of the oil of a turbine engine, which is typically in the range of 180° C., thus allowing to realize a front partition wall of the air inlet lip in aluminum rather than titanium.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 14:
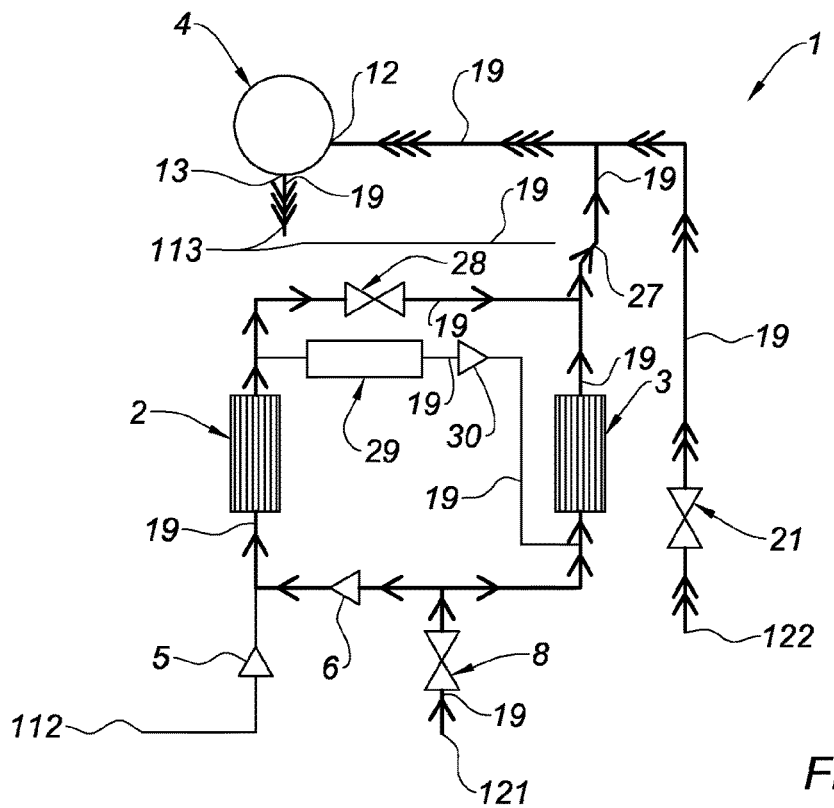
Figure 15:
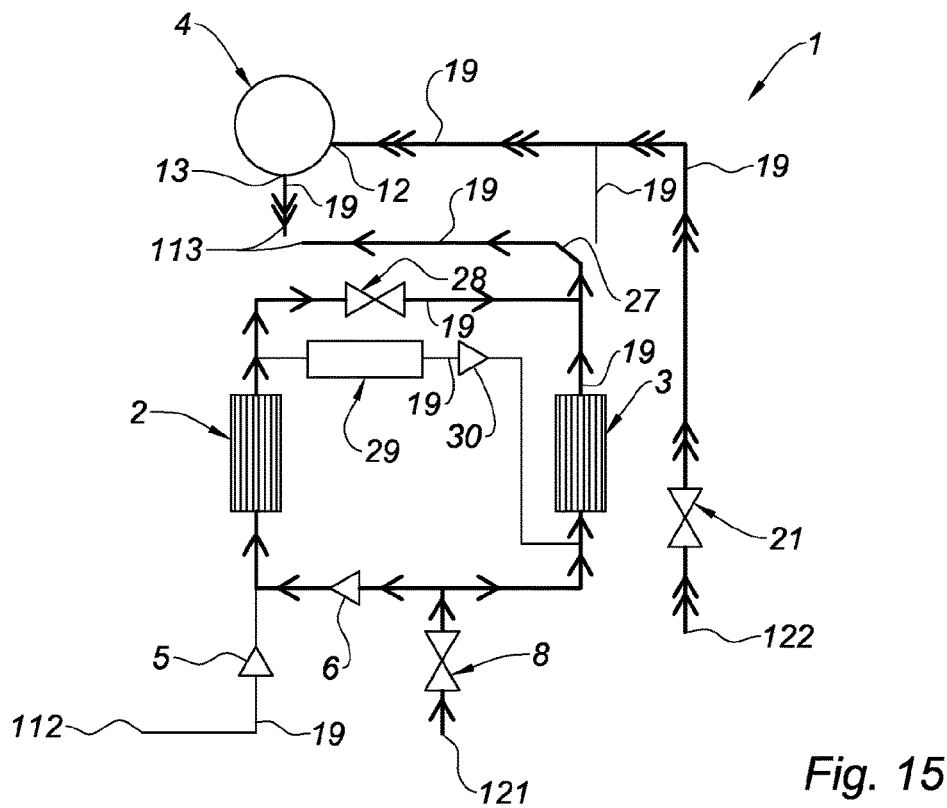

FIG. 14 is a schematic view of the fourth network detailing a circulation of the first fluid throughout the network when the defrosting mode of the air inlet lip is activated; and FIG. 15 is a schematic view of the fourth network detailing the operation of the network in the event of a failure of one or more of the elements intended for controlling the circulation of the first fluid throughout the network.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In forms that are described below, the first fluid is substantially constituted by air, and the second fluid is substantially constituted by engine oil chosen from among those that are commonly used in the aeronautical field. Nonetheless, the first fluid and the second fluid may be constituted substantially by any other materials that may be used together in the aeronautical field.

For the sake of simplicity, in all forms that are described below, the ducts that connect the different elements of the different air circulation networks 1 are called "duct 19".

In all forms that are described below, it is meant by "flowing throughout the network", flowing through all or part of a network 1, by "controlled valve", it is intended a valve which acts as a gate valve, whether power-actuated or not, by "dynamic air scoop", it is intended an air scoop, preferably equipped with at least one control valve.

Figure 1:
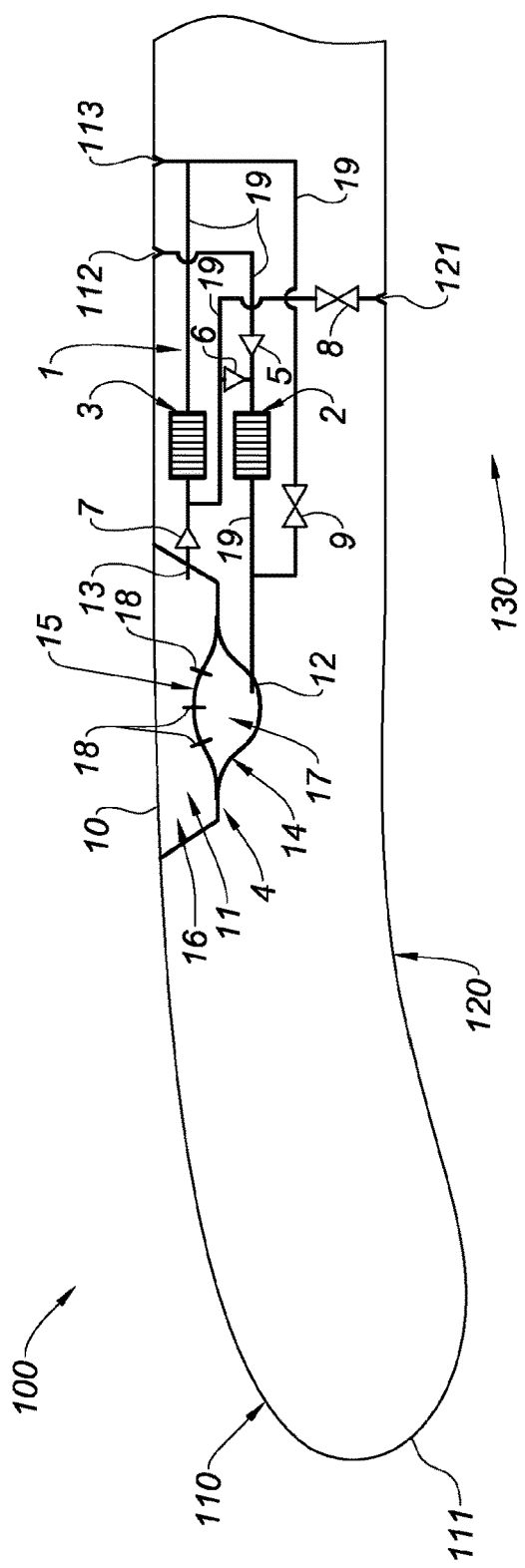
FIG. 1 is a schematic view of a first circulation network for the first fluid according to a first form of the present disclosure.

Referring to FIG. 1, there is described the structure of the first air circulation network 1 according to the first form of the present disclosure.

The first network 1 is comprised in an aircraft nacelle 100.

The nacelle 100 comprises an outer aerodynamic skin 110 comprising an upstream air inlet lip 111 and an inner aerodynamic skin 120. The air inlet lip 111 connects the two outer 110 and inner 120 aerodynamic skins upstream.

The first air circulation network 1, intended for cooling the engine oil, comprises two air/oil heat exchangers (respectively, 2 and 3), and one air/air heat exchanger 4. The first network 1 comprises check valves which only allow the circulation of air in one direction (respectively, 5, 6 and 7), controlled valves (respectively, 8 and 9), and the duct 19. The valves 5, 6, 7, 8 and 9 serve to control the air circulation in the first network 1.

The air/air heat exchanger 4 is a surface heat exchanger which has an exchange surface 10 integrated into the outer aerodynamic skin 110 of the nacelle 100. The air/air heat exchanger 4 also comprises a confined space 11, comprising an air inlet 12 and an air outlet 13 for the first fluid, enclosed by the exchange surface 10 and a peripheral wall 14. The air/air heat exchanger 4 also comprises an intermediate wall 15 which divides the confined space 11 into two volumes so that its midplane is substantially parallel to the midplane of the exchange surface 10, and that one of the volumes, so-called the upper volume 16, is delimited by the exchange surface 10, the peripheral wall 14 and the intermediate wall 15, whereas the other volume, so-called the lower volume 17, is delimited by the peripheral wall 14 and the intermediate wall 15. The intermediate wall 15 is pierced by a plurality of orifices 18. The lower volume 17 is in communication with the air inlet 12, and the upper volume 16 is in communication with the air outlet 13.

The air/air heat exchanger 4 may also only comprise one exchange surface 10 in the contact of which there is a duct 19 of the first circuit 1 in order to cool the air that is flowing in the first network 1 and coming out of the air/oil heat exchanger 2 so that the air is cooled when penetrating in the air/oil heat exchanger 3.

The outer aerodynamic skin 110 of the nacelle comprises a dynamic air scoop 112 for collecting air from the outside of the nacelle, in addition to an outlet orifice 113 for discharging the reheated air out of the nacelle 100 after having flowed throughout the first network 1.

The inner aerodynamic skin 120 comprises an orifice 121 for collecting cold air that comes from a fan 130 of the aircraft by means of a controlled valve 8 of the first network 1, so-called the fan-side collection orifice 121.

Figure 2:
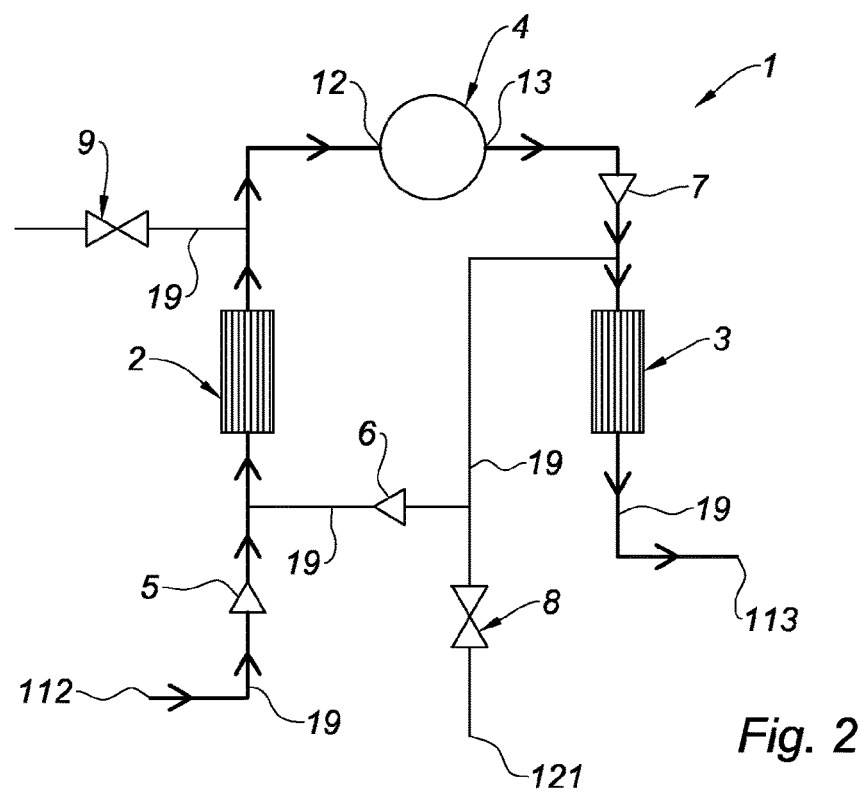
FIG. 2 is a schematic view of the first network detailing the circulation of the first fluid throughout the network in the case where the aircraft is flying at high speed.

Referring to FIG. 2, there is described the operation of the first network 1 in the case where the aircraft is flying at high speed.

The controlled valves 8 and 9, as well as the check valve 6, are closed.

Air penetrates in the duct 19 of the first network 1 through the dynamic air scoop 112 of the outer aerodynamic skin 110. The air that is collected by the dynamic air scoop 112 comes from the outside of the nacelle 100, therefore, it is cold.

Then, the air passes through the check valve 5 of the first network 1, the duct 19, the air/oil heat exchanger 2 where it retrieves the oil heat, and then, it then penetrates in the air/air heat exchanger 4 through the air inlet 12.

In the air/air heat exchanger 4, the air flows from the air inlet 12 in the lower volume 17 and passes across the intermediate wall 15 through the orifices 18 before reaching the upper volume 16. While flowing in the upper volume 16, the air enters into contact with the exchange surface 10 which consists of a heat exchange surface providing heat exchange by impact or by simple circulation of the fluids. At this stage, the air outside of the nacelle 100 is cold and thereby cools the exchange surface 10, which in turn, cools the air in the upper volume 16.

Afterwards, the cooled air that flows in the upper volume 16 penetrates in the duct 19, this time through the air outlet 13, and it passes successively through the check valve 7, the air/oil heat exchanger 3 where it retrieves the oil heat, and then, it is discharged out of the nacelle 100 through the outlet orifice 113 of the nacelle 100.

Figure 3:
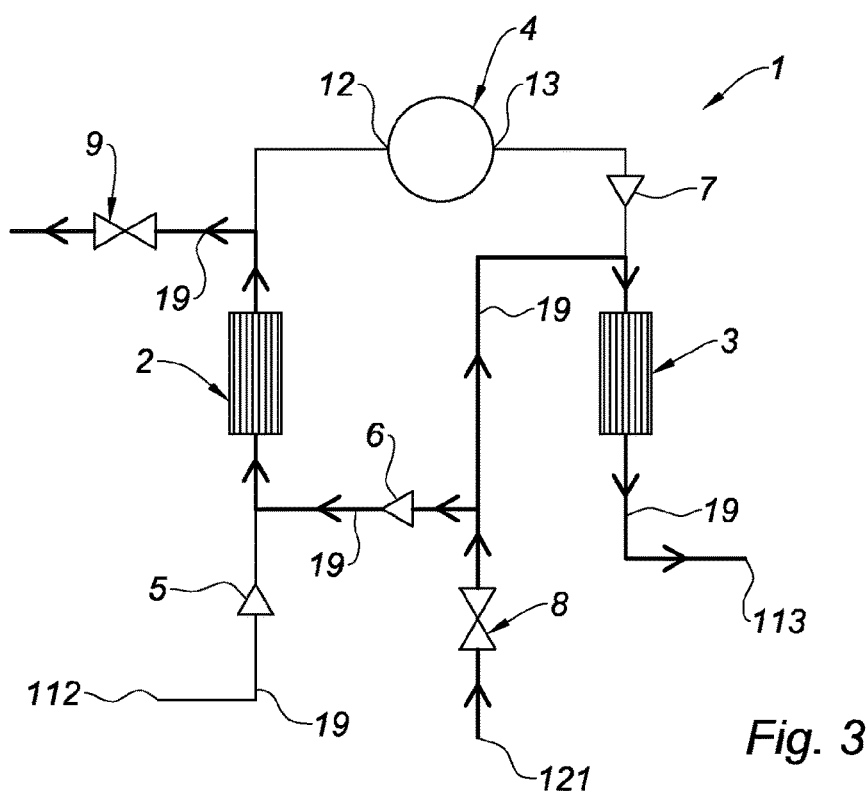
FIG. 3 is a schematic view of the first network detailing the circulation of the first fluid throughout the network in the case where the aircraft is flying at low speed.

Referring to FIG. 3, there is described the operation of the first network 1 in the case where the aircraft is flying at low speed.

In this case, the air is collected in the fan 130 of the nacelle 100, therefore, it is also cold. The check valves 5 and 7 are closed.

Air penetrates through the fan-side collection orifice 121 of the inner aerodynamic skin 120 of the duct 19 of the first network 1, and passes through the electric or pneumatic controlled valve 8. At this stage, the duct 19 is split in order to divide the air flow into two portions, a first portion of the air that has passed through the controlled valve is directed toward the air/oil heat exchanger 2, whereas a second portion is directed toward the air/oil heat exchanger 3.

Before reaching the air/oil heat exchanger 2, the first air portion passes through a check valve 6, once the air has penetrated in the air/oil heat exchanger 2, it is directed toward the outlet orifice 113 of the outer aerodynamic skin 110 after passing through the controlled valve 9.

The second air portion penetrates directly in the air/oil heat exchanger 3, and then, it is directed toward the outlet orifice 113.

Figure 4:
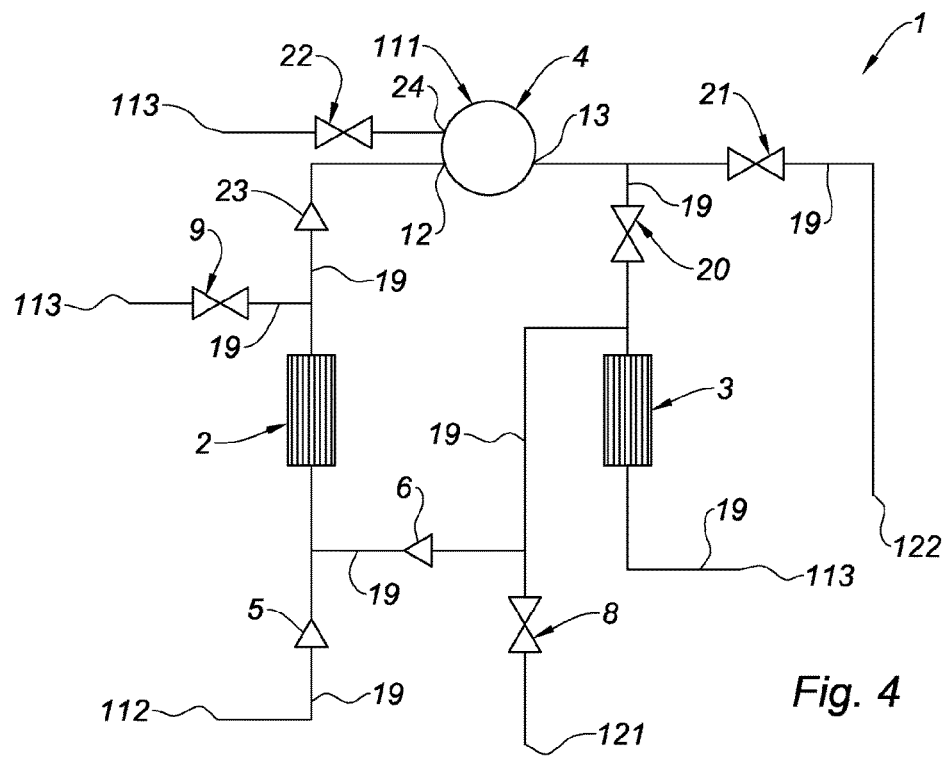
FIG. 4 is a schematic view of a second circulation network for the first fluid according to a second form of the present disclosure.

Referring to FIG. 4, there is described the structure of the second air circulation network 1 according to the second form of the present disclosure.

In this form, the air inlet lip 111 acts as an air/air heat exchanger 4.

The second network 1 comprises five controlled valves 8, 9, 20, 21 and 22; three check valves 5, 6 and 23; two air/oil heat exchangers 2 and 3; one air/air heat exchanger 4.

The nacelle 100 comprises a means for collecting hot air coming from a compressor of the aircraft, so-called the compressor-side collection orifice 122, so as to allow supplying the air inlet lip 111 with hot air. The compressor-side collection orifice 122 is connected to the controlled valve 21 which is, in turn, directly connected to the air/air heat exchanger 4 via the orifice 13.

The air/air heat exchanger 4 comprises three air inlet and outlet orifices. One air outlet orifice 24 is directly connected to the outlet orifice 113 of the nacelle 100 via the controlled valve 22. Another orifice is the orifice 13 which is connected, on the one hand, to the air/oil heat exchanger 3 thereby severing as an air outlet, and on the other hand, to the compressor-side collection orifice 122 via the controlled valve 21 thereby serving as an inlet for the hot air that comes from the compressor (not represented). The third orifice is the air inlet 12 for the air that comes from the air/oil heat exchanger 2.

The air/air heat exchanger 4 operates substantially in the same manner as the heat exchanger described in the previous form (the first network 1).

Figure 5:
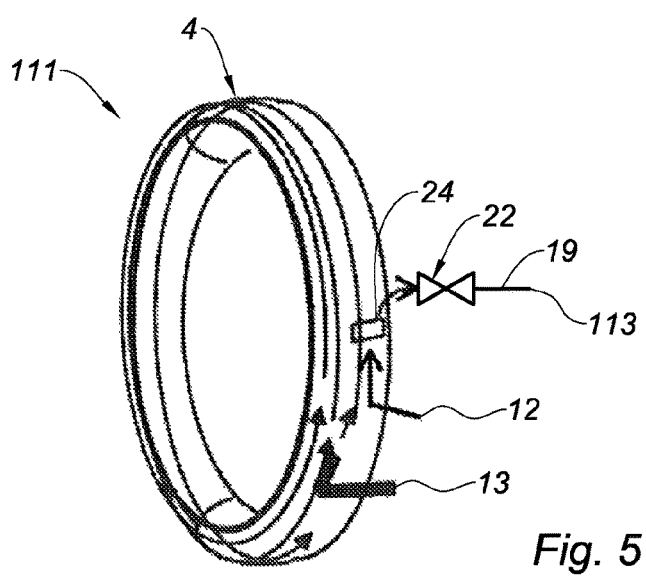
FIG. 5 is a partial perspective view of an air inlet lip of an aircraft nacelle in which the second network is installed.

Referring to FIG. 5, there is described the air inlet lip 111 of the nacelle 100 in which the second air circulation network 1 is installed.

The air inlet lip 111 acts as an air/air heat exchanger 4. The air penetrates thereto through the orifice 13 or through the air inlet 12 and it is discharged through the outlet orifice 24 or through the orifice 13 according to the mode of operation of the second network 1.

Figure 6:
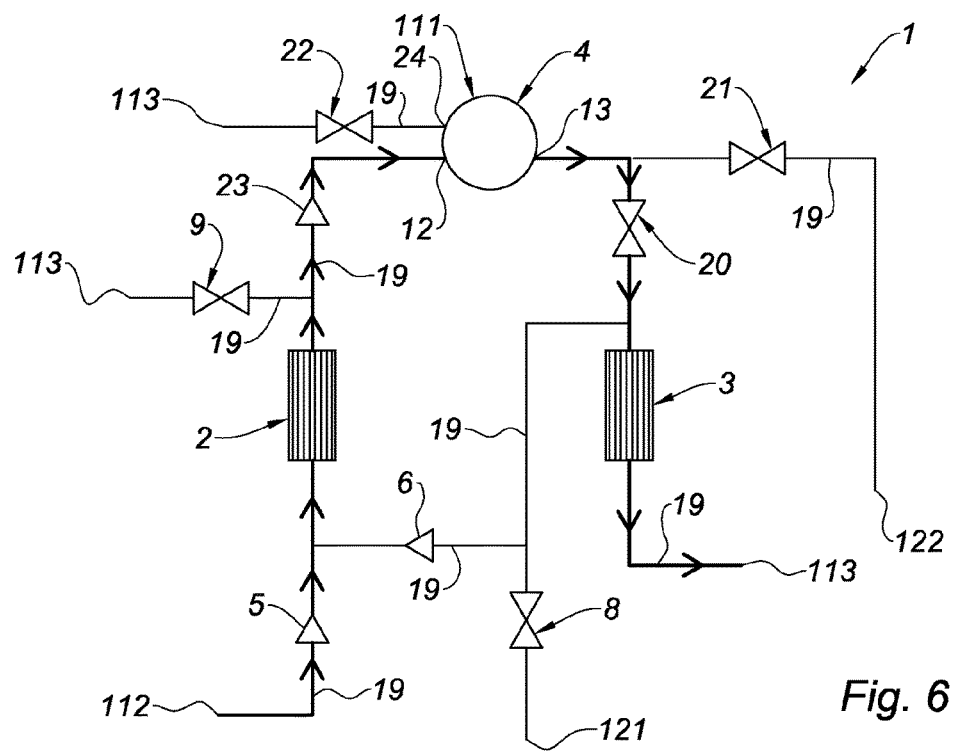
FIG. 6 is a schematic view of the second network detailing the circulation of the first fluid throughout the network in the case where the aircraft is flying at high speed.

Referring to FIG. 6, there is described the operation of the second network 1 in the case where the aircraft is flying at high speed.

The controlled valves 8, 9, 21 and 22, as well as the check valve 6, are closed.

The air penetrates in the duct 19 through the dynamic air scoop 112; coming from the outside of the nacelle 100, the air is thus cold.

Afterwards, the air passes successively through the check valve 5, the air/oil heat exchanger 2 where it is reheated by the engine oil heat, the check valve 23, the air inlet 12, the air/air heat exchanger 4 where it is cooled, the orifice 13, the controlled valve 20, the air/oil heat exchanger 3 where it is reheated by the engine oil heat, and the outlet orifice 113 of the outer aerodynamic skin 110 of the nacelle 100.

Figure 7:
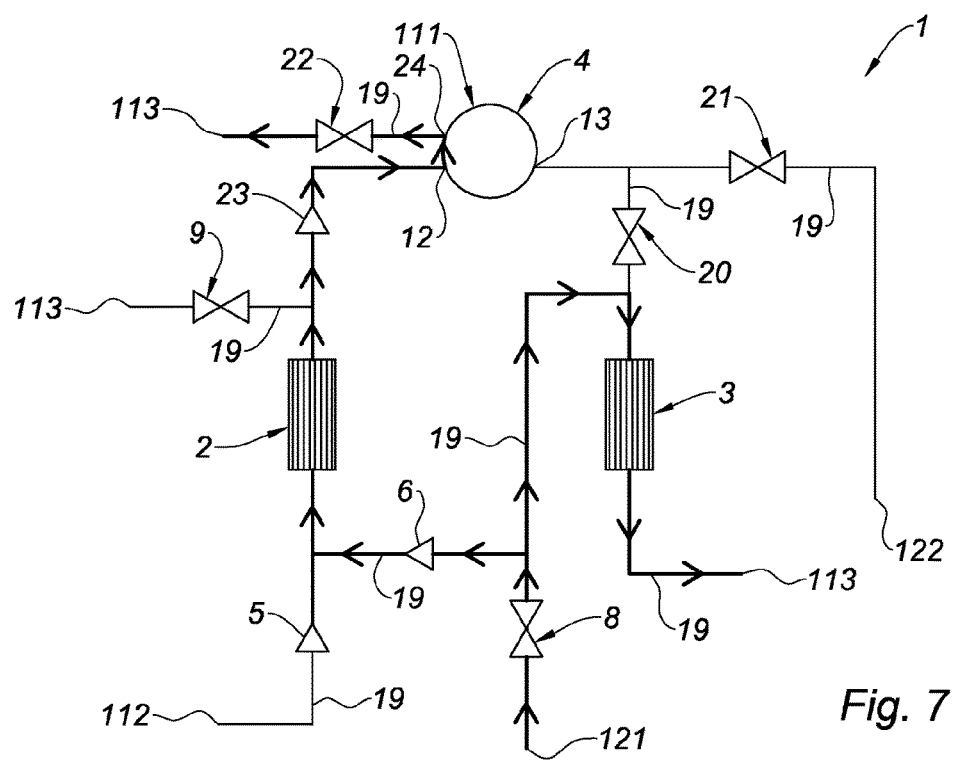
FIG. 7 is a schematic view of the second network detailing the flow of the first fluid throughout the network in the case where the aircraft is flying at low speed.

Referring to FIG. 7, there is described the operation of the second network 1 in the case where the aircraft is flying at low speed.

The controlled valves 9, 20 and 21, as well as the check valve 5, are closed.

The air penetrates in the duct 19 through the fan-side collection orifice 121. The air comes from the fan, therefore, it is cold. Afterwards, the air passes through the controlled valve 8.

At this stage, the duct 19 is split in order to divide the air flow into two portions, a first portion of the air having passed through the controlled valve 8 is directed toward the air/oil heat exchanger 2, whereas a second portion is directed toward the air/oil heat exchanger 3.

Before reaching the air/oil heat exchanger 2, the first air portion passes through the check valve 6, once the air has penetrated in the air/oil heat exchanger 2, it is reheated, and then, it passes through the check valve 23, penetrates in the air/air heat exchanger 4 through the air inlet 12, and immediately afterwards, it is evacuated through the outlet orifice 24 toward the outlet orifice 113 of the outer aerodynamic skin 110 through the controlled valve 22.

The second air portion penetrates directly in the air/oil heat exchanger 3, it is reheated inside, and then, it is evacuated through the outlet orifice 113.

Figure 8:
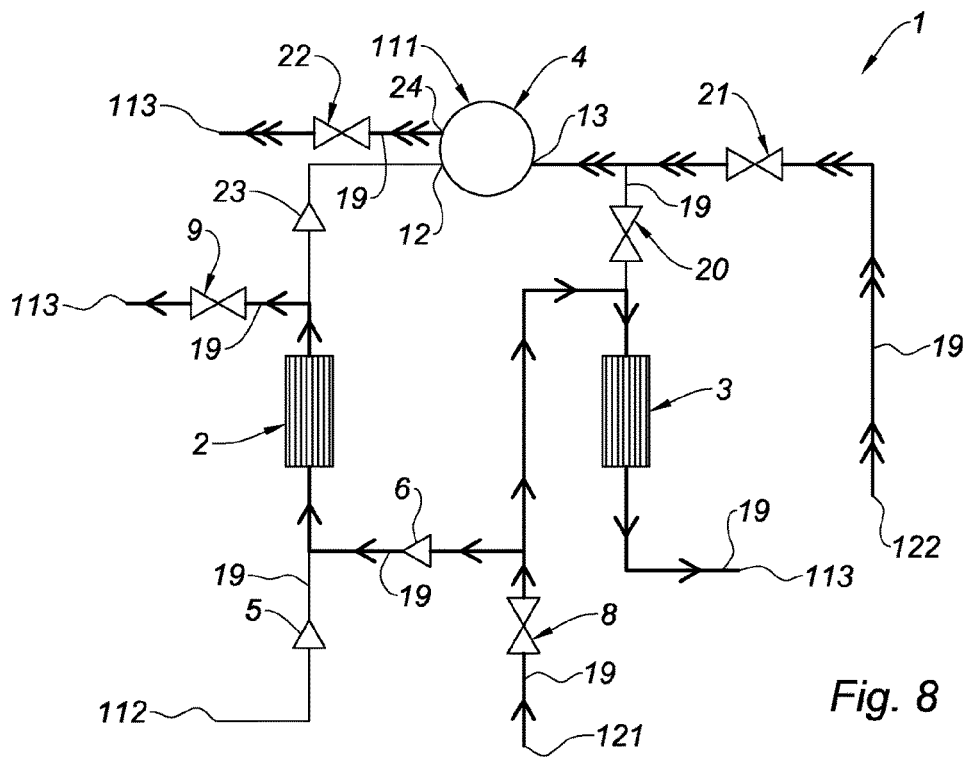
FIG. 8 is a schematic view of the second network detailing a circulation of the first fluid throughout the network when the defrosting mode of the air inlet lip is activated.

Referring to FIG. 8, there is described the operation of the second network 1 when the defrosting mode of the air inlet lip 111 of the nacelle 100 is activated.

The controlled valve 20, as well as the check valves 5 and 23, are closed.

The air penetrates in the duct 19 through the fan-side collection orifice 121. The air comes from the fan, therefore, it is cold. Afterwards, the air passes through the controlled valve 8.

At this stage, the duct 19 is split in order to divide the air flow into two portions, a first portion of the air having passed through the controlled valve 8 is then directed toward the air/oil heat exchanger 2, whereas a second portion is directed toward the air/oil heat exchanger 3.

Before reaching the air/oil heat exchanger 2, the first air portion passes through a check valve 6, once the air has penetrated in the air/oil heat exchanger 2, it is reheated, and then, it is evacuated toward the outlet orifice 113 through the controlled valve 9.

The second air portion penetrates directly in the air/oil heat exchanger 3, it is reheated inside, and then, it is evacuated through the outlet orifice 113.

Thus, by passing through the air/oil heat exchangers 2 and 3, the engine oil is cooled.

Meanwhile, air penetrates in the duct 19 of the second network 1 through the compressor-side collection orifice 122. Coming from the compressor, the air is thus hot and at high pressure. This air then passes through the controlled valve 21, to then be directed directly toward the orifice 13 and be injected at high pressure in the air inlet lip 111 which acts as an air/air heat exchanger 4. The air thus injected at high pressure performs several revolutions along the circumference of the air inlet lip 111 in order to defrost the entire air inlet lip 111, and then, it is evacuated toward the outlet orifice 113 through the controlled valve 22.

Figure 9:
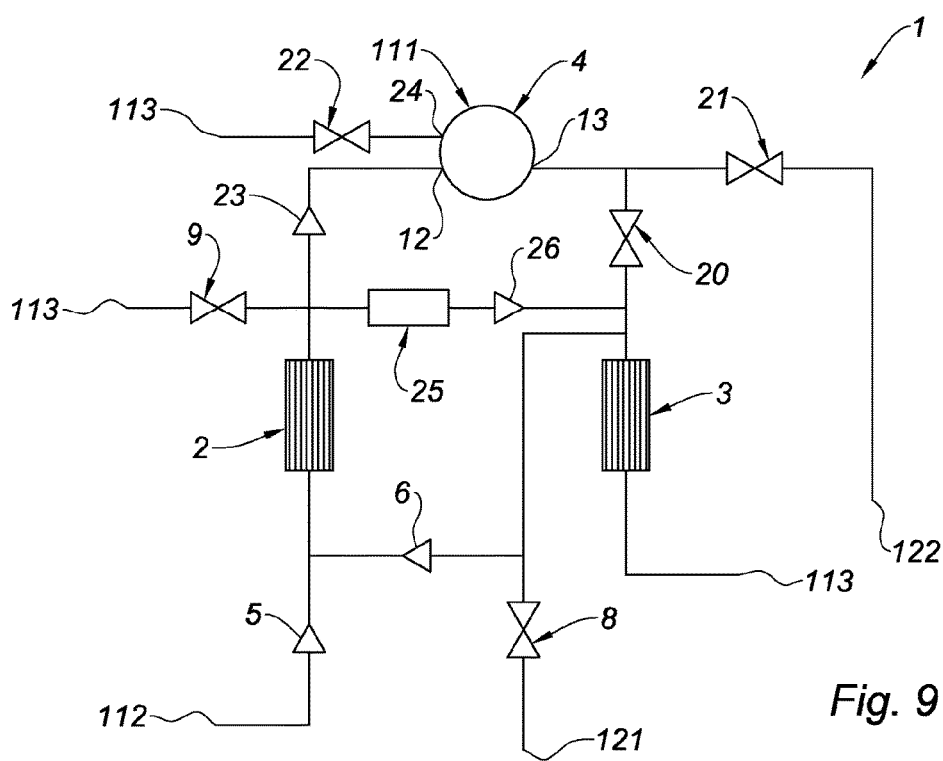
FIG. 9 is a schematic view of a third circulation network for the first fluid according to a third form of the present disclosure.

Referring to FIG. 9, there is described the third air circulation network 1 according to the third form of the present disclosure.

The third network 1 has the same structure as the second network (FIGS. 4, 5, 6, 8) in which have been added a second air/air heat exchanger 25 as well as an additional check valve 26.

Figure 10:
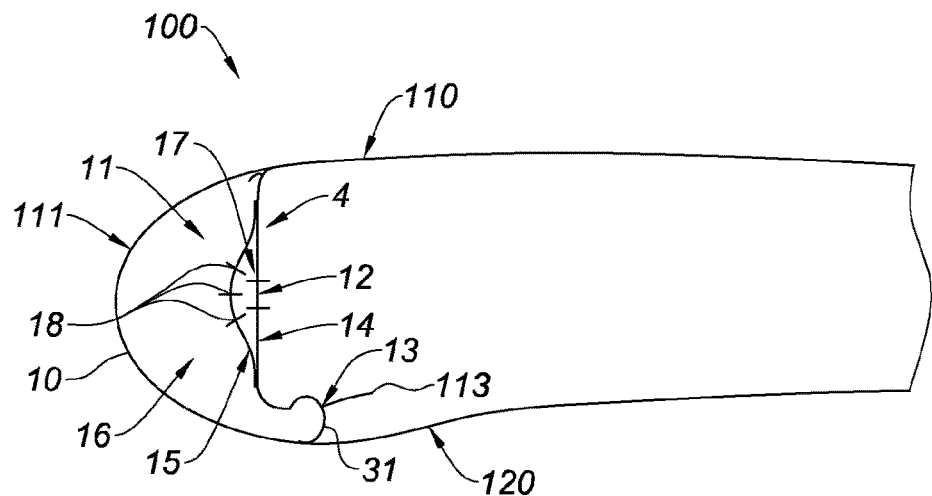
FIG. 10 is a schematic view of the air inlet lip equipped with a fourth circulation network for the first fluid according to a fourth form of the present disclosure.

Referring to FIG. 10, there is described an air inlet lip 111 of an outer aerodynamic skin 110 of a nacelle 100 in which an air/air heat exchanger 4 is installed.

The air/air heat exchanger 4 of FIG. 10 is realized on the same principle as the heat exchanger of FIG. 1. In fact, it comprises the exchange surface 10 and the peripheral wall 14, wherein the front partition wall of the air inlet lip 111 delimiting a confined space 11, the intermediate wall 15 divides this confined space into two portions, the upper volume 16 and the lower volume 17, the intermediate wall 15 is pierced by a plurality of orifices 18. The lower volume 17 is in communication with the air inlet 12, and the upper volume 16 is in communication with the air outlet 13.

The air/air heat exchanger 4 is different from the heat exchanger of FIG. 1 in that it comprises a collector 31 which serves for retrieving the air that is comprised in the upper volume 16 of the air/air heat exchanger 4, which is then directed toward the outlet orifice 113 of the nacelle 100.

Figure 11:
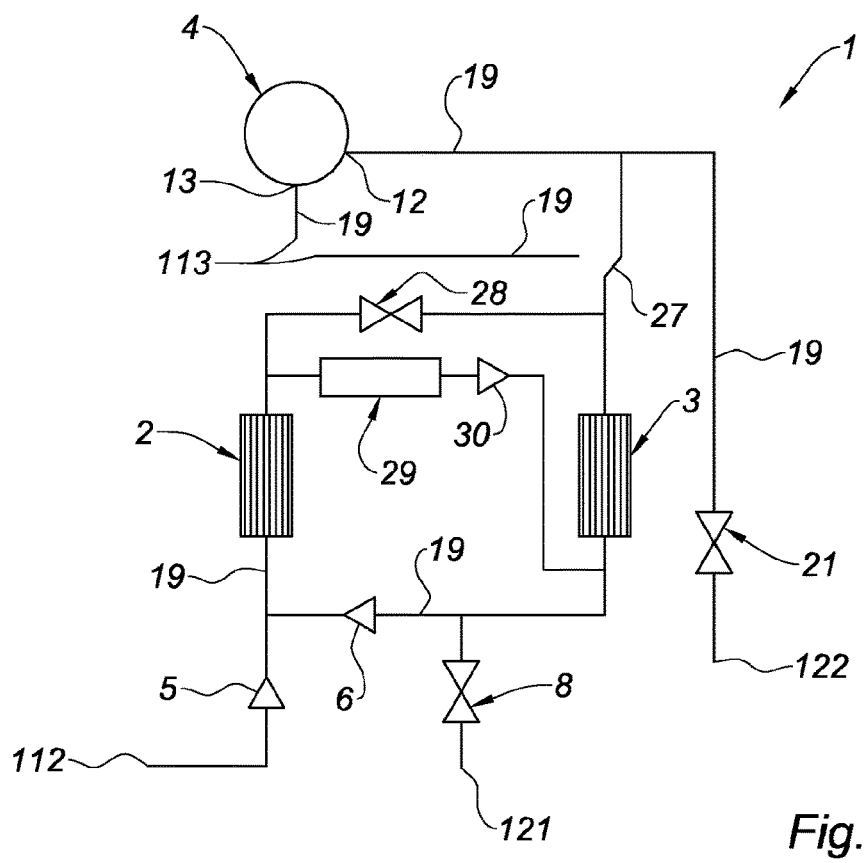
FIG. 11 is a schematic view of the fourth circulation network for the first fluid according to the fourth form of the present disclosure.

Referring to FIG. 11, there is described the structure of the fourth air circulation network 1 which equips the air inlet lip 111.

The fourth network 1 comprises three controlled valves 8, 21 and 28, three check valves 5, 6 and 30, one two-position valve 27, two air/oil heat exchangers 2 and 3, and two air/air heat exchangers 4 and 29.

The nacelle 100 comprises the compressor-side collection orifice 122, connected to the controlled valve 21 which, in turn, is connected to the air inlet 12 of the air/air heat exchanger 4, the fan-side collection orifice 121, connected to the controlled valve 8, the dynamic air scoop 112 and the outlet orifice 113.

Since the collector 31 is comprised in the air/air heat exchanger, it is not represented here. However, it leads to the air outlet 13 which, in turn, leads to the outlet orifice 113 of the nacelle.

The two-position valve 27 allows directing the air flow that comes from the air/oil heat exchangers 2 and 3, alternately toward two different directions, the first leading directly to the outlet orifice 113 of the nacelle 100, the other leading directly to the air/air heat exchanger 4.

The air/air heat exchanger 29 may be installed in the nacelle 100 in the same manner as detailed in FIG. 1.

Figure 12:
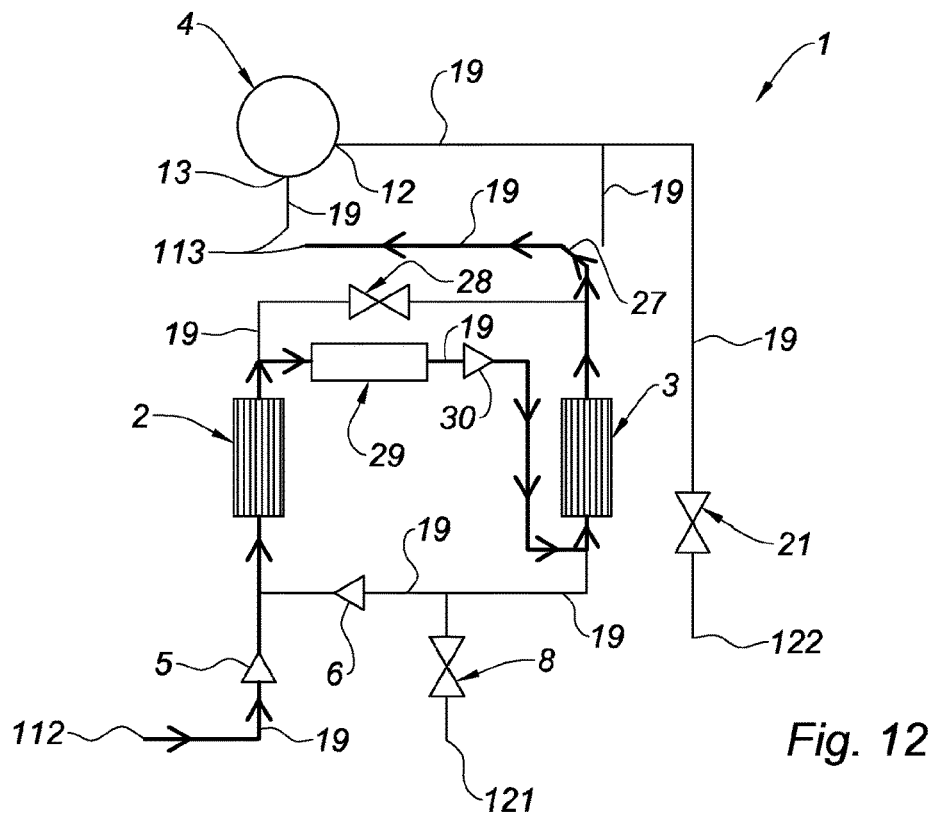
FIG. 12 is a schematic view of the fourth network detailing the circulation of the first fluid throughout the network in the case where the aircraft is flying at high speed.

Referring to FIG. 12, there is described the operation of the fourth network 1 in the case where the aircraft is flying at high speed.

The controlled valves 8, 21 and 28 are closed, the check valve 6 is closed, and the two-position valve 27 directs the air flow directly toward the outlet orifice 113.

The air penetrates in the fourth network 1 through the dynamic air scoop 112 of the nacelle 100, and then, it passes successively through the check valve 5, the air/oil heat exchanger 2 where it is reheated, the air/air heat exchanger 29 where it is cooled, the check valve 30, the air/oil heat exchanger 3 where it is reheated, and then, it is directed directly toward the outlet orifice 113 through the two-position valve 27 which is positioned for this purpose.

Thus, by passing through the air/oil heat exchangers 2 and 3, the engine oil is cooled.

This operation of the fourth network 1 with regard to the circulation of air within it is substantially similar to that of the first network as detailed in FIG. 2.

Figure 13:
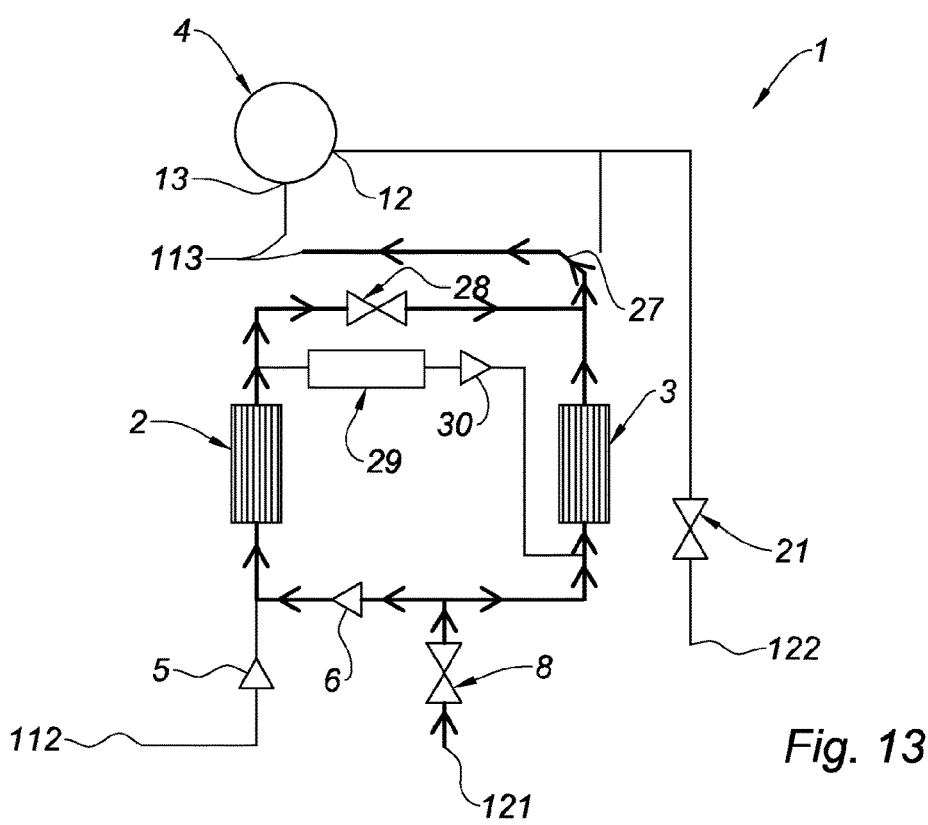
FIG. 13 is a schematic view of the fourth network detailing a circulation of the first fluid throughout the network in the case where the aircraft is flying at low speed.

Referring to FIG. 13, there is described the operation of the fourth network 1 in the case where the aircraft is flying at low speed.

In this case, the controlled valve 21 is closed, the check valves 5 and 30 are closed, and the two-position valve 27 directs the air flow directly toward the outlet orifice 113.

The air penetrates in the duct 19 through the fan-side collection orifice 121, coming from the fan, the air is therefore cold. Then, the air passes through the controlled valve 8.

At this stage, the duct 19 is split in order to divide the air flow into two portions, a first portion of the air having passed through the controlled valve 8 is directed toward the air/oil heat exchanger 2, whereas a second portion is directed toward the air/oil heat exchanger 3.

Before reaching the air/oil heat exchanger 2, the first air portion passes through the check valve 6, once the air has penetrated in the air/oil heat exchanger 2, it is reheated, and then, it passes through the controlled valve 28, and immediately afterwards, it is evacuated toward the outlet orifice 113 via the two-position valve 27.

The second air portion penetrates directly in the air/oil heat exchanger 3, it is reheated inside, and then, it is evacuated through the outlet orifice 113 via the two-position valve 27.

Thus, by passing through the air/oil heat exchangers 2 and 3, the engine oil is cooled.

Referring to FIG. 14, there is described the operation of the fourth circuit 1 when the defrosting mode of the air inlet lip 111 of the nacelle 100 is activated.

The check valves 5 and 30 are closed, the two-position valve 27 directs the air flow directly toward the air/air heat exchanger 4.

The air penetrates in the duct 19 through the fan-side collection orifice 121, the air is therefore cold. Then, it passes through the controlled valve 8.

At this stage, the duct 19 is split in order to divide the air flow into two portions, a first portion of the air that has passed through the controlled valve 8 is directed toward the air/oil heat exchanger 2, whereas a second portion is directed toward the air/oil heat exchanger 3.

Before reaching the air/oil heat exchanger 2, the first air portion passes through the check valve 6, once the air has penetrated in the air/oil heat exchanger 2, it is reheated, and then, it passes through the controlled valve 28, and immediately afterwards, it is directed via the two-position valve 27 toward the air/air heat exchanger 4.

The second air portion penetrates directly in the air/oil heat exchanger 3, it is reheated inside, and then, is directed toward the air/air heat exchanger 4 via the two-position valve 27.

Thus, by passing through the air/oil heat exchangers 2 and 3, the engine oil is cooled.

Meanwhile, air penetrates in the duct 19 of the fourth network 1 through the compressor-side collection orifice 122, coming from the compressor, therefore, it is hot and at high pressure. This air is then passed through the controlled valve 21, and then, is directed directly toward the air inlet 12.

At this stage, the air that comes from the compressor and the air that comes from the air/oil heat exchangers 2 and 3 meet in the duct 19, the new air flow that is formed then reaches the air inlet 12. Then, the air is injected at high pressure in the air inlet lip 111 which acts as an air/air heat exchanger 4. The air that is injected at high pressure then performs several revolutions along the circumference of the air inlet lip 111 in order to defrost the entire air inlet lip 111, and then, it is evacuated toward the outlet orifice 113 through the collector 31 and then the air outlet 13.

Referring to FIG. 15, there is described the operation of the fourth network 1 in the event of a failure of one valve or more.

In this case, the controlled valves 8, 21 and 28 are forced to open, and the two-position valve 27 is forced to direct the air flow that passes therethrough directly toward the outlet orifice 113 of the nacelle 100. The check valve 6 is open whereas the check valves 5 and 30 are closed.

In this case, the air flow that comes from the fan through the fan-side collection orifice 121 follows the same path as detailed in the description of FIG. 13, whereas the air flow coming from the compressor through the compressor-side collection orifice 122 follows the same path as that detailed in the description of FIG. 14.

It is also possible to consider a fourth network 1 wherein the compressor-side collection orifice has been removed. This type of network is implemented when the air that has flowed through the air/oil heat exchangers 2 and 3 has reached a temperature that is sufficient for defrosting the air inlet lip 111, which also acts as an air/air heat exchanger 4.

In all the aforementioned forms, the outlet orifice 113 may be placed at the inner aerodynamic skin 120 of the nacelle 100.

In the forms where the air/air heat exchanger 4 is installed in the air inlet lip 111, the air that is introduced in the air/air heat exchanger 4 performs at least one revolution along the circumference of the air inlet lip 111 in order to defrost the entire air inlet lip 111 before being evacuated from the air/air heat exchanger 4.

The aforementioned forms allow significantly reducing the total consumption of the aircraft by approximately from 0.25% to 0.4% in comparison with a cooling performed only by collection in the secondary duct. In the cases where they allow defrosting the air inlet lip, they then allow reducing the temperature of the air inlet lip, thereby reducing the recurrent issues of fatigue, and of the upstream area of the outer aerodynamic skin, the temperature of said area not exceeding the maximum temperature of the turbine engine oil, which is typically in the range of 180° C., allowing to realize the front partition wall of the air inlet in aluminum rather than titanium.

Although the present disclosure has been described through particular form examples, it goes without saying that it is not limited thereto and that it encompasses all technical equivalents of the described means, as well as their combinations, should these fall within the scope of the present disclosure.

What is claimed is:

1. A nacelle for an aircraft comprising:
   an outer aerodynamic skin comprising an upstream air inlet lip;
   an inner aerodynamic skin, the upstream air inlet lip connecting the outer and inner aerodynamic skins;
   a front partition wall located immediately downstream of the upstream air inlet lip and connecting the outer and inner aerodynamic skins; and
   a circulation network for a first fluid cooling a second fluid comprising at least two air/oil heat exchangers and at least one air/air heat exchanger,
   wherein the circulation network comprises:
   at least one dynamic air scoop configured to collect air from an outside of the nacelle;
   at least one orifice configured to collect cold air from a fan; and
   at least one outlet orifice configured to discharge air out of the nacelle,
   wherein the at least one air/air heat exchanger is located, with regard to a path of the first fluid, between the at least two air/oil heat exchangers.

2. The nacelle according to claim 1, wherein the at least one air/air heat exchanger is a surface heat exchanger having an exchange surface.

3. The nacelle according to claim 2, wherein the exchange surface is integrated into the outer aerodynamic skin of the nacelle.

4. The nacelle according to claim 2, wherein the at least one air/air heat exchanger comprises an intermediate wall pierced by a plurality of orifices.

5. The nacelle according to claim 2, wherein the at least one air/air heat exchanger has a confined space, comprising an inlet and an outlet for the first fluid, enclosed by walls including the exchange surface and a peripheral wall.

6. The nacelle according to claim 5, wherein the confined space is located in the upstream air inlet lip.

7. The nacelle according to claim 1, wherein the at least one orifice supplies the cold air to each of the at least two air/oil heat exchangers.

8. The nacelle according to claim 1, further comprising at least one controlled means for collecting hot air coming from a compressor of the aircraft so as to supply the upstream air inlet lip with hot air in an area between a peripheral wall and an intermediate wall.

9. The nacelle according to claim 1, further comprising at least one high-pressure injector which is controlled so as to inject hot air coming from a controlled hot air collection means into the upstream air inlet lip.

10. The nacelle according to claim 1, wherein the at least one outlet orifice is disposed at the outer aerodynamic skin for discharging the first fluid which is reheated out of the nacelle after having flowed throughout the circulation network.

* * * * *